(12) United States Patent
Jitkoff et al.

(10) Patent No.: US 9,411,499 B2
(45) Date of Patent: Aug. 9, 2016

(54) JUMP TO TOP/JUMP TO BOTTOM SCROLL WIDGETS

(75) Inventors: Nicholas Jitkoff, Palo Alto, CA (US); Roma Shah, San Francisco, CA (US); Alex Ainslie, San Francisco, CA (US)

(73) Assignee: Google Inc., Mountain View, CA (US)

( * ) Notice: Subject to any disclaimer, the term of this patent is extended or adjusted under 35 U.S.C. 154(b) by 27 days.

(21) Appl. No.: 13/245,762

(22) Filed: Sep. 26, 2011

(65) Prior Publication Data

US 2012/0272183 A1    Oct. 25, 2012

Related U.S. Application Data

(63) Continuation of application No. 13/090,034, filed on Apr. 19, 2011.

(51) Int. Cl.
*G06F 3/048* (2013.01)
*G06F 3/0485* (2013.01)
*G06F 3/0488* (2013.01)

(52) U.S. Cl.
CPC ............ *G06F 3/0485* (2013.01); *G06F 3/0488* (2013.01); *G06F 2203/04804* (2013.01); *G06F 2203/04806* (2013.01)

(58) Field of Classification Search
USPC .......... 715/786, 784, 781, 764, 700; 345/684
See application file for complete search history.

(56) References Cited

U.S. PATENT DOCUMENTS

| | | | |
|---|---|---|---|
| 5,530,455 A | 6/1996 | Gillick et al. | |
| 6,037,937 A | 3/2000 | Beaton et al. | |
| 6,052,110 A | 4/2000 | Sciammarella et al. | |
| 6,690,365 B2* | 2/2004 | Hinckley et al. | 345/173 |
| 6,972,776 B2* | 12/2005 | Davis et al. | 345/684 |
| 7,274,377 B2* | 9/2007 | Ivashin et al. | 345/619 |
| 7,366,995 B2 | 4/2008 | Montague | |
| 9,164,670 B2* | 10/2015 | Lobo | G06F 3/0485 |
| 2002/0112237 A1 | 8/2002 | Kelts | |
| 2004/0150630 A1* | 8/2004 | Hinckley | G06F 3/0418 345/173 |
| 2005/0223342 A1* | 10/2005 | Repka et al. | 715/851 |

(Continued)

FOREIGN PATENT DOCUMENTS

EP    1837747    9/2007

OTHER PUBLICATIONS

"Arrow appearing when scrolling page"; Opera Mini Forums, Apr. 14, 2011, Internet, Retrieved from Internet: URL:http://my.opera.com/community/forums/t opic.dm1?id=959712 Apr. 14, 2011.

(Continued)

*Primary Examiner* — Tadeese Hailu
*Assistant Examiner* — Darrin Hope
(74) *Attorney, Agent, or Firm* — Troutman Sanders LLP; James E. Schutz; Andrew C. Doherty

(57) ABSTRACT

Methods and systems for accelerated scrolling and zooming of content. A method may include receiving an indication of a scroll action. The scroll action indicates a direction to scroll and a user's intent to scroll a significant distance. The method further includes evaluating the direction and a length of the scroll action. The method still further includes providing a scroll widget, for example by an operating to an application. The widget is to be presented relative to a location of where the indication was received. The scroll widget then allows a user to jump to a top or an end of a content displayed at the location.

17 Claims, 8 Drawing Sheets

(56) References Cited

U.S. PATENT DOCUMENTS

| | | |
|---|---|---|
| 2006/0048073 A1* | 3/2006 | Jarrett et al. ............... 715/784 |
| 2007/0150830 A1 | 6/2007 | Ording et al. |
| 2008/0062207 A1* | 3/2008 | Park ........................... 345/684 |
| 2008/0148177 A1 | 6/2008 | Lang et al. |
| 2008/0155461 A1* | 6/2008 | Ozaki ................. G06F 3/0485 715/784 |
| 2008/0168404 A1 | 7/2008 | Ording |
| 2008/0174570 A1 | 7/2008 | Jobs et al. |
| 2008/0235617 A1* | 9/2008 | Kim .................. G06F 3/04855 715/786 |
| 2009/0073194 A1 | 3/2009 | Ording |
| 2009/0237421 A1 | 9/2009 | Kim et al. |
| 2009/0307633 A1* | 12/2009 | Haughay, Jr. ......... G06F 1/1626 715/841 |
| 2010/0064250 A1 | 3/2010 | Schroeder et al. |
| 2010/0289825 A1 | 11/2010 | Shin et al. |

OTHER PUBLICATIONS

PCT International Search Report and Written Opinion dated Jan. 14, 2013 for related PCT Patent Application No. PCT/US2012/034045.

* cited by examiner

JUMP TO TOP/JUMP TO BOTTOM SCROLL WIDGETS

CROSS-REFERENCE

This application is a continuation of U.S. application Ser. No. 13/090,034, filed Apr. 19, 2011, which is hereby in its entirety.

BACKGROUND

1. Technical Field

The field relates to operating systems and applications that allow scrolling, and more particularly to contextual widgets for jumping to the top or bottom of a screen.

2. Background

In computing, scrolling is the act of moving content up or down in a display screen. Scrolling may be performed by using a pointing device such as a mouse or a touch pad. Scrolling may also be performed directly on the screen of a touch screen device by "dragging" the content in the desired direction. This feature is common to devices such as smart phones. However, to reach the bottom of the content a user must either continuously press and hold a scroll down arrow key, or continuously drag the content until the bottom is reached. Likewise, to return to the top of the content a user must either continuously press and hold a scroll up arrow key, or continuously drag the content until the top is reached.

Similarly, in computing, zooming is the act of increasing or decreasing the magnification level of the content. Zooming in (increasing the magnification level) and zooming out (decreasing the magnification level) are performed in levels of magnification that requires tedious work on the part of the user. There is no was to instantly go to full magnification, or return the magnification level to zero.

BRIEF SUMMARY

In an embodiment, a method includes receiving an indication of a scroll action, which indicates a direction to scroll and a user's intent to scroll a significant distance. The direction and length of the scroll is evaluated. A scroll widget is then provided to be presented relative to a location of where the indication was received, thus allowing a user to jump to a top or an end of a content displayed at the location.

In another embodiment, a method includes receiving an indication of a scroll action, which indicates a direction to scroll and a user's intent to scroll a significant distance. The direction and length of the scroll are evaluated. A scroll widget is then displayed to be presented relative to a location of where the indication was received, thus allowing a user to jump to a top or an end of a content displayed at the location.

In yet another embodiment, a method includes receiving an indication of a zoom action, which indicates a magnification level and a user's intent to continuously adjust the magnification level. The direction and length of the zoom action are evaluated. Then a zoom widget is provided that are to be presented relative to a location of where the indication was received, wherein the zoom widget allows a user to completely zoom in or completely zoom out a content displayed at the location.

In yet another embodiment, a system includes an on-screen input receiver that receives an indication of a scroll action. A scroll/zoom accelerator, implemented with a computing device, evaluates the direction and length of the scroll action. The system then provides a scroll widget to be presented relative to a location of where the indication was received. The scroll widget allows a user to jump to a top or an end of a content displayed at the location.

Further embodiments, features, and advantages of the invention, as well as the structure and operation of the various embodiments of the invention are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments refer to illustrations described herein with reference to particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Many operations on touch devices are tedious, particularly those involving zooming in and out or scrolling long lists of items. These embodiments relate to accelerator widgets which are added contextually, revealing a jump to top button when users are scrolling quickly. A similar widget may be visible for zooming in and out, allowing easy jumping to full or zero magnification, or sized to fit.

Figure 1A:
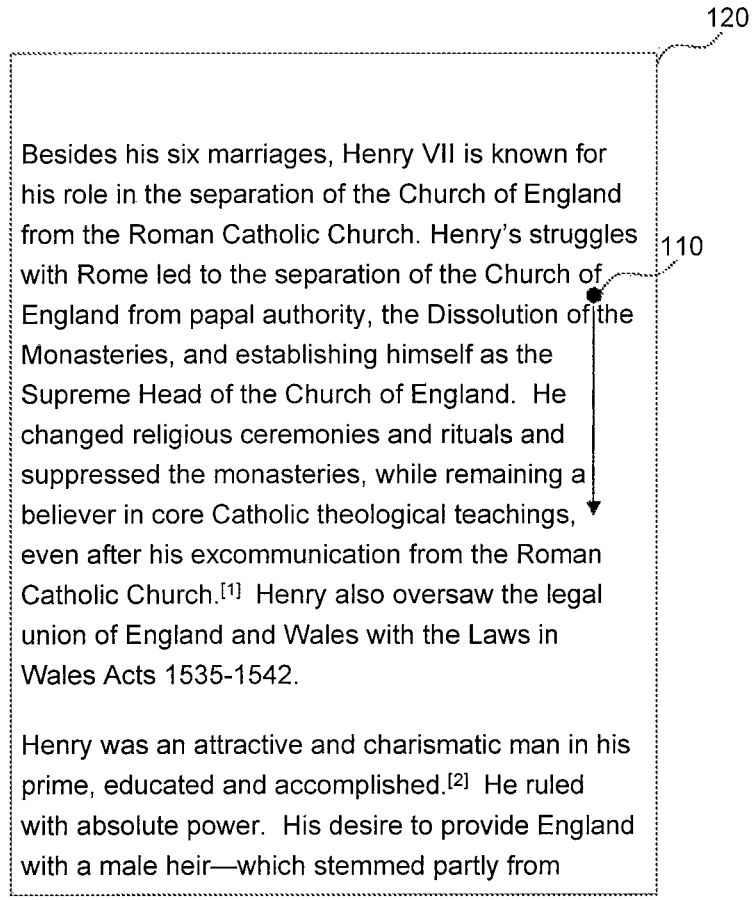
FIG. 1A illustrates an example scroll action in accordance with an embodiment.

FIG. 1A illustrates an example scrolling action in accordance with an embodiment. Scroll indication 110 indicates a user's intent to scroll through content 120 in a downward direction. Scroll indication 110 may be made by a pointing device or through direct contact with a device screen.

Figure 1B:
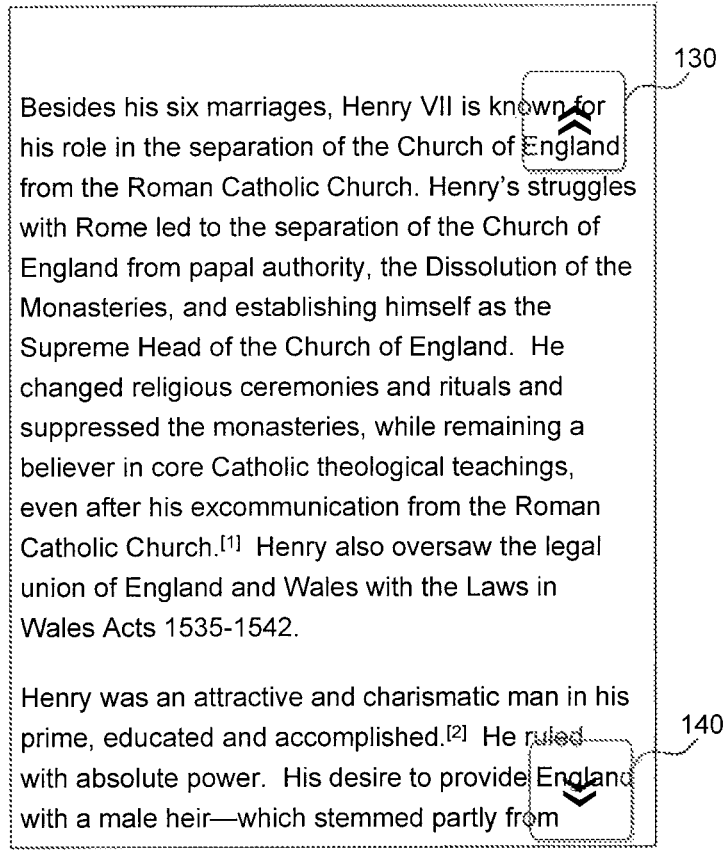
FIG. 1B illustrates an example presentation of scroll widgets in accordance with an embodiment.

FIG. 1B illustrates the presentation of scroll widgets in accordance with an embodiment. Up scroll widget 130 and down scroll widget 140 are presented when an indication is received that the user is going to scroll a significant distance. This indication may be based on the number of pages scrolled, the speed at which pages are scrolled, the length of a page scrolled, the amount of time spent scrolling, or any other comparable threshold. Up scroll widget 130 allows a user to jump to the top of the content. Down scroll widget 140 allows a user to jump to the bottom of the content. Alternatively, though not shown, one widget may be presented that performs jumps either to the top or bottom of the content.

Figure 1C:
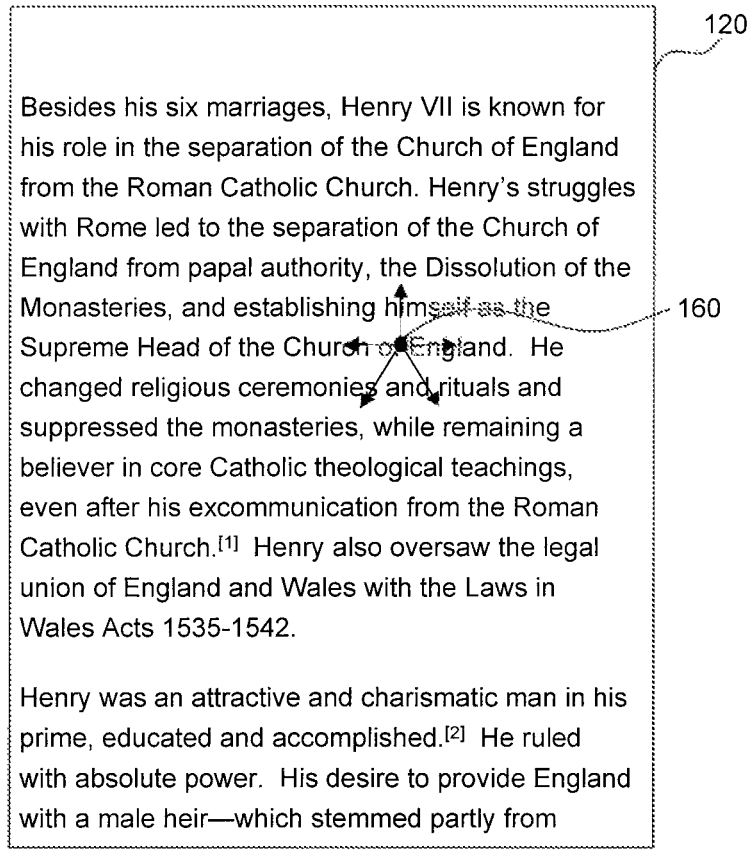
FIG. 1C illustrates an example zoom action in accordance with an embodiment.

FIG. 1C illustrates an example zoom action in accordance with an embodiment. Zoom indication 160 indicates a user's intent to zoom into or out of content 120. Zoom indication 160 may be made by a pointing device or through direct contact with a device screen.

Figure 1D:
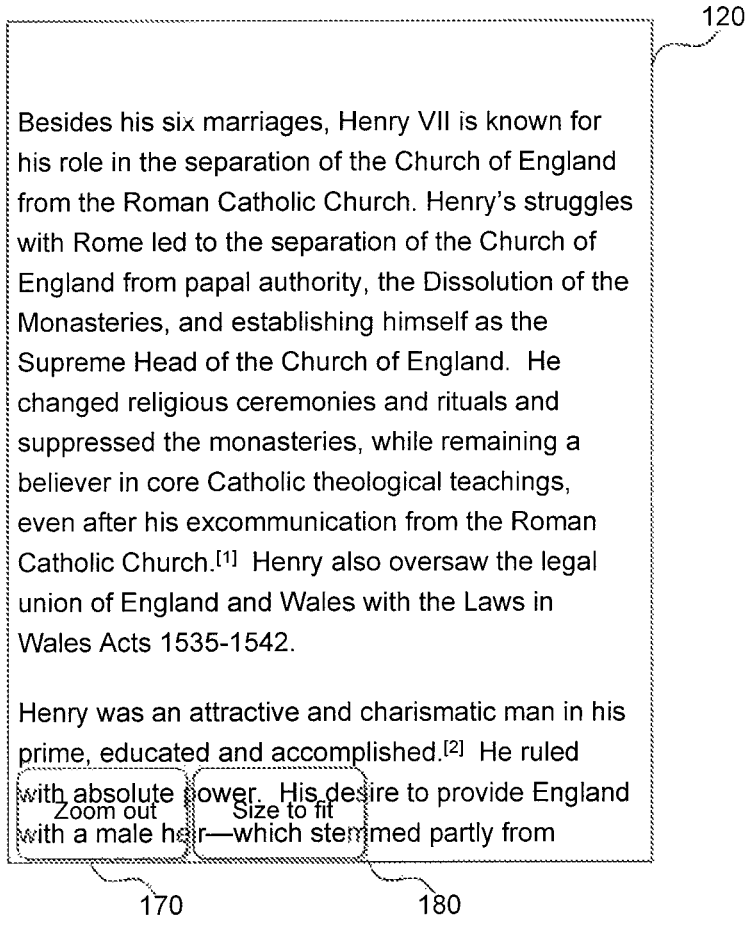
FIG. 1D illustrates an example presentation of zoom widgets in accordance with an embodiment.

FIG. 1D illustrates the presentation of zoom widgets in accordance with an embodiment. Zoom out widget 170 and size to fit widget 180 are presented when an indication is received that the user is continuously zooming. This indication may be based on the number of levels of magnification traversed, the amount of time spent zooming, of any other comparable threshold. Zoom out widget 170 allows a user to completely zoom out by instantly returning to a zero-magnification view of the displayed content. Size to fit widget 180 allows a user to completely zoom in on content 120 to a maximum level by instantly displaying the content at the maximum level of magnification. Alternatively, size to fit widget 180 may allow a user to zoom in to a specific part of content 120 such that the magnified content is sized to fit the display. In an embodiment, widgets 130, 140, 170, and 180 may be transparent such that the underlying content may still be at least partially visible.

Figure 2:
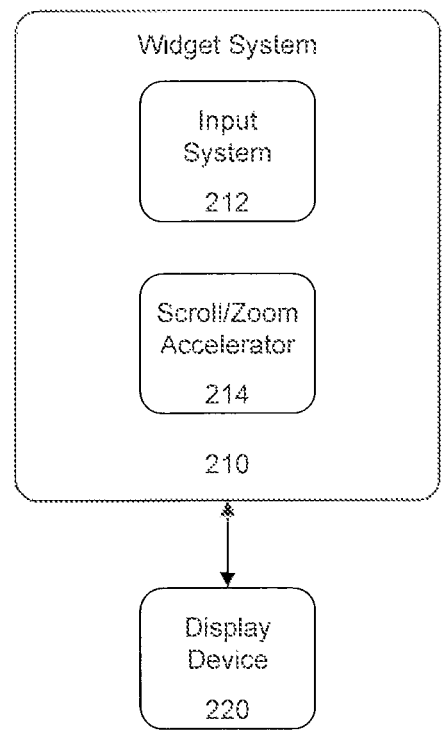
FIG. 2 is a block diagram of exemplary system for providing or displaying widgets to accelerate scrolling or zooming on a screen according to an embodiment.

FIG. 2 is a block diagram of exemplary system 200 for providing or displaying widgets to accelerate scrolling or zooming on a screen according to an embodiment. System 200, or any combination of its components, may be part of or may be implemented with a computing device. Examples of computing devices include, but are not limited to, a computer, workstation, distributed computing system, computer cluster, embedded system, stand-alone electronic device, networked device, mobile device (e.g. mobile phone, smart phone, navigation device, tablet or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and user interface display. System 200 may include widget system 210 in communication with display device 220. Widget system 210 may include an input system 212 and a scroll/zoom accelerator 214.

Input system 212, according to one embodiment, receives an indication of a scroll action that indicates the user intends to scroll a significant distance, or an indication that the user is zooming continuously, according to another embodiment. Scroll/zoom accelerator 214 may evaluate the direction and length of the scroll or zoom action, and provide or display the corresponding widget relative to where the indication was received on the screen. Widget system 210 may be implemented in an operating system or an application. When widget system 210 is implemented in the operating system, the widgets are provided to the application by widget system 210 for display on display device 220. When widget system 210 is implemented in the application, widget system 210 directly displays the widgets on display device 220. When widget system 210 detects that scrolling or zooming has stopped, widget system provides an indication to remove the widgets from the display, or in the case where widget system 210 is implemented in an application, the widget is removed from the display upon indication the scrolling or zooming has ceased.

Figure 3:
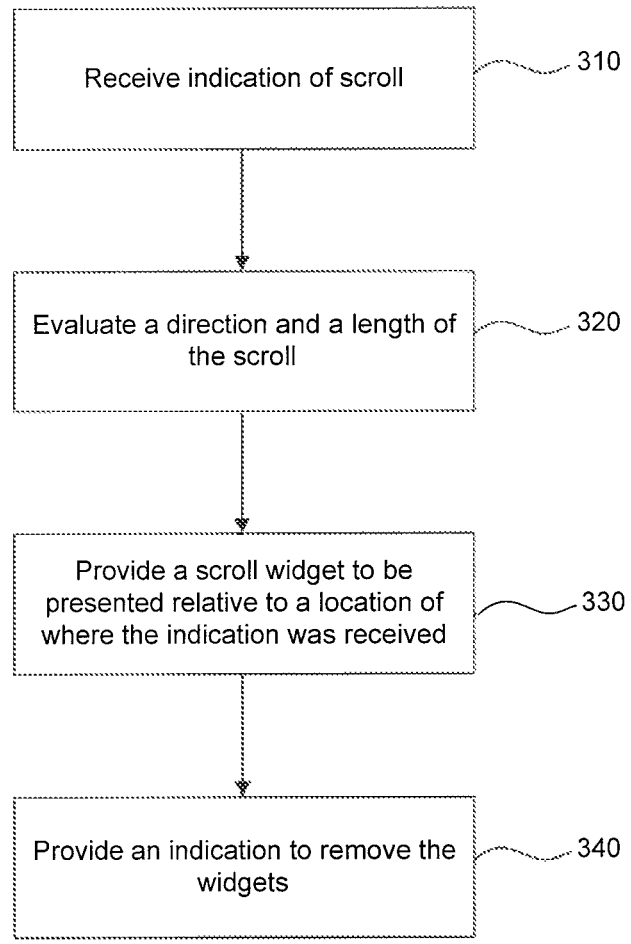
FIG. 3 is a flowchart of a method for providing scroll acceleration widgets in accordance with an embodiment.

FIG. 3 is a flowchart of a method 300 for providing scroll acceleration widgets 130 and 140 in accordance with an embodiment. In one embodiment, an indication of a scroll action is received at 310 (e.g., by input receiver 212). The scroll action indicates a direction to scroll and a user's intent to scroll a significant distance. At 320 the direction and a length of the scroll action are evaluated. At 330, widget system 210 provides a scroll widget to be presented relative to a location of where the indication was received. The scroll widget allows a user to jump to a top or an end of a content displayed at the location. When widget system 210 detects that scrolling or zooming has ceased, widget system 210 provides an indication to remove the widgets 130 and 140 from the screen at 340. In such a method, the widget system 210 may be implemented in the operating system.

Figure 4:
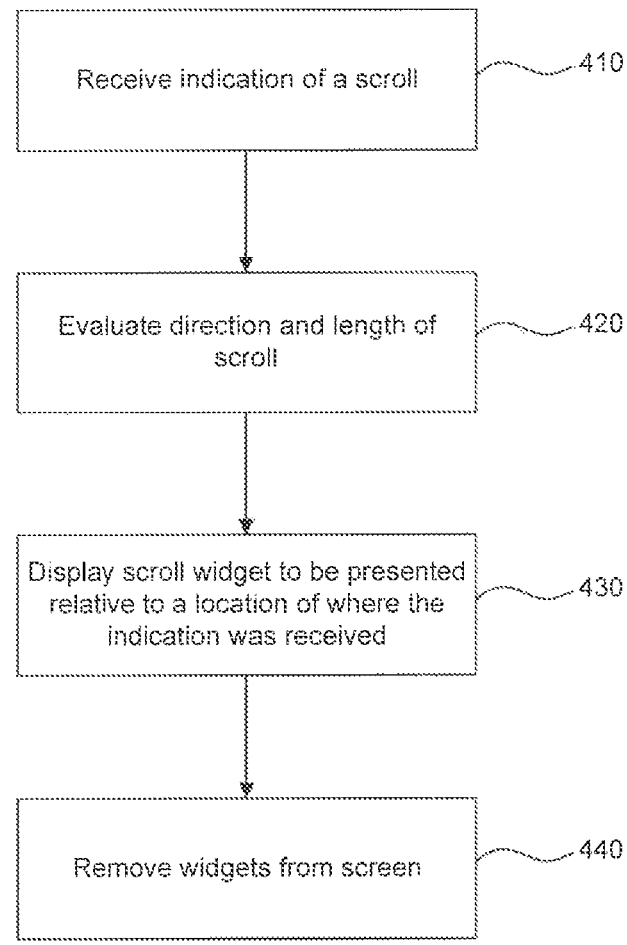
FIG. 4 is a flowchart of a method for displaying scroll acceleration widgets in accordance with an embodiment.

FIG. 4 is a flowchart of a method 400 for displaying scroll acceleration widgets 130 and 140 in accordance with an embodiment. In another embodiment, an indication of a scroll action is received at 410 (e.g., by input receiver 212). The scroll action indicates a direction to scroll and a user's intent to scroll a significant distance. At 420 the direction and a length of the scroll action are evaluated. At 430, widget system 210 displays a scroll widget to be presented relative to a location of where the indication was received. The scroll widget allows a user to jump to a top or an end of a content displayed at the location. When widget system 210 detects that scrolling or zooming has ceased, widget system 210 removes the widgets 130 and 140 from the screen at 440. In such a method, the widget system 210 may be implemented in the an application.

Figure 5:
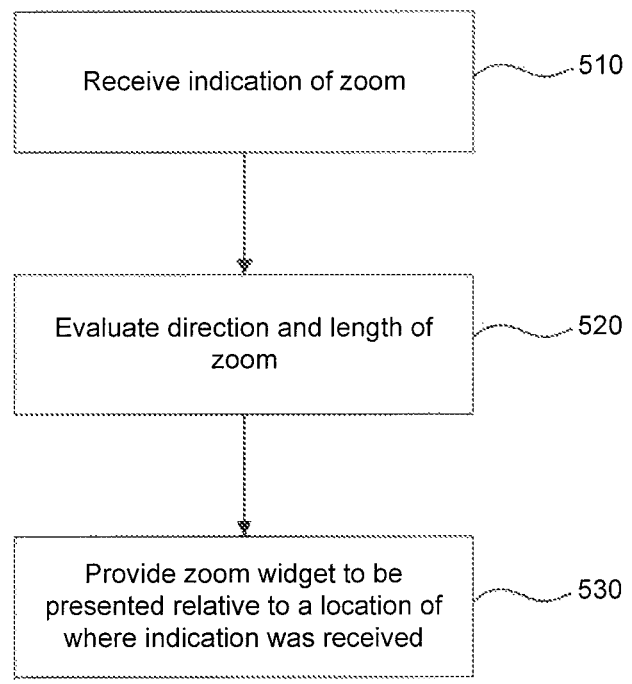
FIG. 5 is a flowchart of a method for providing zoom acceleration widgets in accordance with an embodiment.

FIG. 5 is a flowchart of a method 500 for providing zoom acceleration widgets 170 and 180 in accordance w'th an embodiment. In an embodiment, an indication of a zoom action is received at 510 (e.g., by input receiver 212). The zoom action indicates a magnification level and a user's intent to continuously adjust the magnification level. The direction and a length of the zoom action are then evaluated at 520. The widget system 210 then provides a zoom widget to be presented relative to a location of where the indication was received at 530. The zoom widget allows a user to completely zoom in or completely zoom out a content displayed at the location. In addition, content may be sized to fit the screen via a zoom widget.

Aspects of the embodiments for exemplary system 200, such as widget system 210, input receiver 212, scroll/zoom accelerator 214 and display device 220, and/or methods 300-500 or any parts) or function(s) thereof may be implemented using hardware, software modules, firmware, tangible computer readable or computer usable storage media having instructions stored thereon, or a combination thereof and may be implemented in one or more computer systems or other processing systems.

Embodiments may be directed to computer products comprising software stored on any computer usable medium. Such software, when executed in one or more data processing device, causes a data processing device(s) to operate as described herein.

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The breadth and scope of the present invention should not be limited by any of the above-described exemplary embodiments.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A computer-implemented method, comprising:
   receiving a scroll action on a touch device, wherein the scroll action indicates a direction to scroll and a length of the scroll action, wherein the scroll action is a press of a virtual scroll key or a dragging gesture associated with content output on a display of the touch device;
   determining whether the length of the scroll action exceeds a predetermined threshold; and
   in response to determining that the length of the scroll action exceeds the predetermined threshold, outputting, on the display, a scroll widget, wherein the scroll widget provides functionality to jump to a top or an end of the content output on the touch device.

2. The method of claim 1, further comprising:
   determining a direction of the scroll action, and
   wherein displaying a scroll widget comprises:
   displaying a down scroll widget when the direction of the scroll action is down and the length of the scroll action indicates that the end of the content should, be displayed, and
   displaying an up scroll widget when the direction of the scroll action is up and the length of the scroll action indicates that the top of the content should be displayed.

3. The method of claim 2, wherein the down scroll widget allows a user to jump to the end of the content.

4. The method of claim 2, wherein the up scroll widget allows the a user to jump to the top of the content.

5. The method of claim 1, further comprising:
   receiving an indication of an end of the scroll action; and
   removing the scroll widget from display.

6. The method of claim 1, wherein the length of the scroll action is a distance.

7. The method of claim 1, wherein the length of the scroll action is an amount of time.

8. The method of claim 1, wherein the scroll widget is displayed relative to a location of where the scroll action was received.

9. The method of claim 1, wherein displaying a scroll widget comprises: providing an indication to display the scroll widget.

10. The method of claim 1, wherein the predetermined threshold is based upon a number of pages scrolled or a length of time spent scrolling.

11. A system, comprising:
    an on-screen input receiver configured to: receive an indication of a scroll action, wherein the scroll action is a press of a virtual scroll key or a dragging gesture associated with content output on a display of the touch device;
    a scroll/zoom accelerator, implemented with a computing device, configured to:
       determine whether the length of the scroll action exceeds the predetermined threshold, and
       in response to determining that the scroll action exceeds the predetermined threshold, outputting, on the display, a scroll widget, wherein the scroll widget provides functionality to jump to a top or an end of the content output on the touch device.

12. The system of claim 11, where the scroll/zoom accelerator is further configured to:
    determine a direction of the scroll action; and
    in response to determining that the scroll action is above the predetermined threshold:
    display a down scroll widget when the direction of the scroll action is down and the length of the scroll action indicates that the end of the content should be displayed, and
    display an up scroll widget when the direction of the scroll action is up and the length of the scroll action indicates that the top of the content should be displayed.

13. The system of claim 12, wherein the up scroll widget allows a user to jump to the top of the content.

14. The system of claim 12, wherein the down scroll widget allows a user to jump to the end of the content.

15. The system of claim 11, wherein the length of the scroll action is a distance.

16. The system of claim 11, wherein the length of the scroll action is an amount of time.

17. The system of claim 11, wherein the predetermined threshold is based upon a number of pages scrolled or a length of time spent scrolling.

* * * * *